United States Patent [19]

Frank et al.

[11] 4,203,618
[45] May 20, 1980

[54] PASSIVE OCCUPANT RESTRAINT SYSTEM

[75] Inventors: William R. Frank, Warren; David F. Manz, Bloomfield Hills, both of Mich.

[73] Assignee: General Motors Corporation, Detroit, Mich.

[21] Appl. No.: 945,309

[22] Filed: Sep. 25, 1978

[51] Int. Cl.² ............................................. B60R 21/02
[52] U.S. Cl. ..................................... 280/804; 297/469
[58] Field of Search ................................ 280/744–747, 280/801, 802, 803, 804, 808; 297/388, 389

[56] References Cited

U.S. PATENT DOCUMENTS

| | | | |
|---|---|---|---|
| 3,680,883 | 8/1972 | Keppel et al. | 280/150 SB |
| 3,833,239 | 9/1974 | Coenen | 280/150 SB |

FOREIGN PATENT DOCUMENTS

| | | | |
|---|---|---|---|
| 2261374 | 7/1974 | Fed. Rep. of Germany | |
| 2248636 | 12/1977 | Fed. Rep. of Germany | |
| 1332741 | 10/1973 | United Kingdom | 280/745 |

Primary Examiner—Robert R. Song
Assistant Examiner—D. W. Underwood
Attorney, Agent, or Firm—Charles E. Leahy

[57] ABSTRACT

A fixed length of belt has an outboard end attached to the door and an inboard end attached to the vehicle body forwardly of the seat. A track extends longitudinally inboard the seat and mounts a belt carriage which slidably receives the belt intermediate the inboard and outboard ends. Opening movement of the door causes the outboard end of the belt to be moved outwardly and forwardly so that sliding movement of the belt through the belt carriage causes forward movement of the belt carriage to stow the belt forwardly of the seat. A spring retracts the carriage toward the seat to establish the belt in a rearward restraining position when the door is closed. In the preferred embodiment, the belt having its inboard end mounted on the vehicle body forwardly of the seat has its outboard end attached high on the vehicle door to provide a diagonal shoulder belt. A lap belt has an outboard end attached low on the vehicle door and an inboard end mounted inboard the seat. A retractor is associated with at least one end of the lap belt to extend the length of the lap belt during door opening movement. The lap belt is slidably received by the belt carriage so that forward movement of the carriage by the shoulder belt during door opening movement also unwinds lap belt from the retractor and moves the inboard portion of the lap belt to a stowed position forwardly of the occupant.

3 Claims, 3 Drawing Figures

PASSIVE OCCUPANT RESTRAINT SYSTEM

The invention relates to a passive occupant restraining lap and shoulder belt system.

BACKGROUND OF THE INVENTION

It is well known in motor vehicles to restrain an occupant in the seat by a lap belt disposed across the lap and a shoulder belt disposed diagonally across the chest. It is also known to connect the outboard belt ends to the door so that the belt is automatically moved between a restraining position about the occupant and a stowed position outwardly and forwardly of the seat in response to movement of the door between open and closed positions.

It has been recognized that passive seat belt systems are further improved by moving the outboard lap belt end forwardly and/or upwardly upon opening movement of the door to facilitate ingress or egress. U.S. Pat. No. 3,680,883, issued Aug. 1, 1972 to Keppel et al provides a track on the door having a guide loop traveling thereon to move the outboard lap belt end forwardly and upwardly upon opening movement of the door.

There are also patents which recognize the advantage of moving the inboard end of the belts upwardly and forwardly. For example, U.S. Pat. No. 3,833,239, issued Sept. 3, 1974 to Coenen, provides a track which extends longitudinally of the vehicle body inboard the occupant seat for moving the inboard lap ends forwardly upon opening movement of the door.

SUMMARY OF THE INVENTION

The present invention provides a new and improved lap and shoulder belt system wherein the outward movement of the outboard belt ends during door opening movement induces upward and forward lifting movement of the inboard belt ends to facilitate occupant ingress and egress.

According to the invention, a fixed length of belt has an outboard end attached to the door and an inboard end attached to the vehicle body forwardly of the seat. A track extends longitudinally inboard the seat and mounts a belt carriage which slidably receives the belt intermediate the inboard and outboard ends. Opening movement of the door causes the outboard end of the belt to be moved outwardly and forwardly so that sliding movement of the belt through the belt carriage causes forward movement of the belt carriage to stow the belt forwardly of the seated occupant. A spring acts upon the carriage to retract the carriage toward the seat to reestablish the belt in a rearward restraining position when the door is closed. The belt having its inboard end mounted on the vehicle body forwardly of the seat preferably has its outboard end attached high on the vehicle door to provide a diagonal shoulder belt. A lap belt has an outboard end attached low on the vehicle door and an inboard end mounted inboard the seat. At least one end of the lap belt has a retractor associated therewith to extend the length of the lap belt during door opening movement. The lap belt is slidably received by the belt carriage intermediate the inboard and outboard ends thereof so that forward movement of the carriage induced by sliding movement of the shoulder belt therethrough during door opening movement also unwinds lap belt from its associated retractor and moves the inboard portion of the lap belt to a stowed position forwardly of the occupant.

The object, feature and advantage of the invention resides in the provision of a fixed length restraint belt having an outboard end mounted on the door and an inboard end mounted on the instrument panel with a carriage slidably receiving the belt intermediate its ends for moving along a longitudinally extending track inboard the occupant seat to automatically move the inboard portion of the belt between a forwardly stowed position when the door is open and a rearward restraining position when the door is closed.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
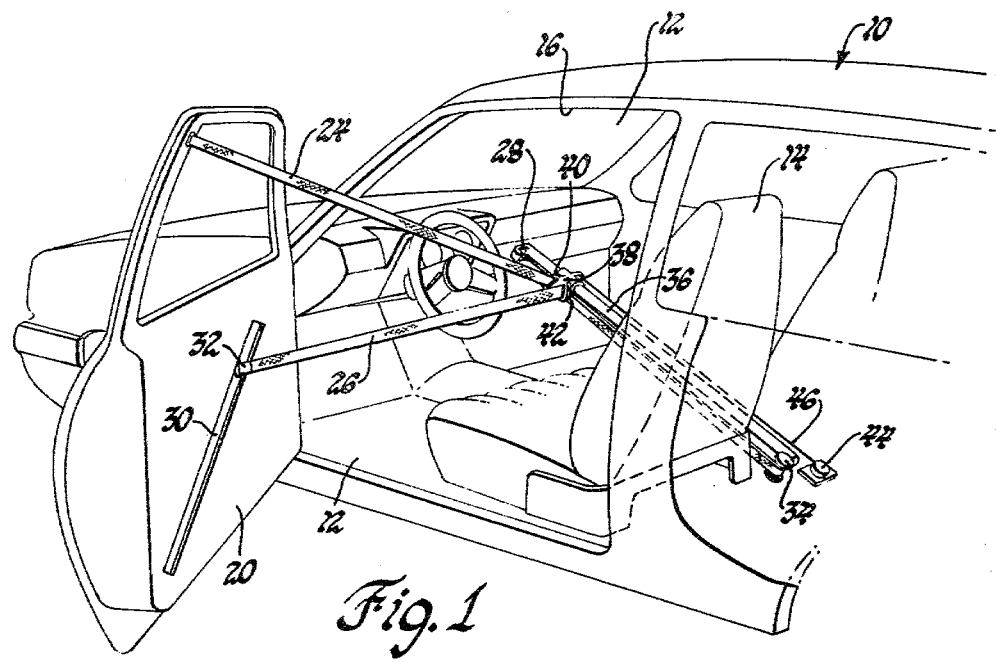
FIG. 1 is a perspective view of a motor vehicle occupant compartment having a belt system according to the invention with the lap and shoulder belts shown in the forwardly stowed position when the vehicle door is open.

Referring to FIG. 1, a vehicle body generally indicated at 10, defines a passenger compartment 12 in which an occupant seat 14 is provided for seating an occupant. The vehicle body has a door opening 16 which is selectively closed by a door 20 having its forward end pivoted to the vehicle body.

A restraint belt arrangement includes a shoulder belt 24 and a lap belt 26. The outboard end of the shoulder belt 24 is suitably attached to the upper rear corner of the window frame of door 20. The inboard end of shoulder belt 24 is attached at 28 to a suitably reinforced instrument panel structure of the vehicle body generally forwardly and inboard of the occupant seat 14. The outboard end of lap belt 26 is suitably mounted on the vehicle door 20 by a linear locking retractor assembly generally indicated at 30. A suitable such device is disclosed in U.S. patent application Ser. No. 914,394, filed by David F. Manz et al June 12, 1978 or Ser. No. 914,621, filed by Clarence C. Irwin et at June 12, 1978. Another suitable such device is disclosed in U.S. Pat. No. 3,770,078, issued Nov. 6, 1973 to Keppel et al. For purposes of the present invention, it will be sufficient to understand that such a linear locking retractor device includes a carriage 32 which is normally retracted to the lower rearward end of the track assembly and has an associated locking mechanism which prevents extension of the belt 26 under emergency conditions. The inboard end of the lap belt 26 is mounted on the vehicle body inboard and rearwardly of the occupant seat 14 by a conventional seat belt retractor 34.

Figure 2:
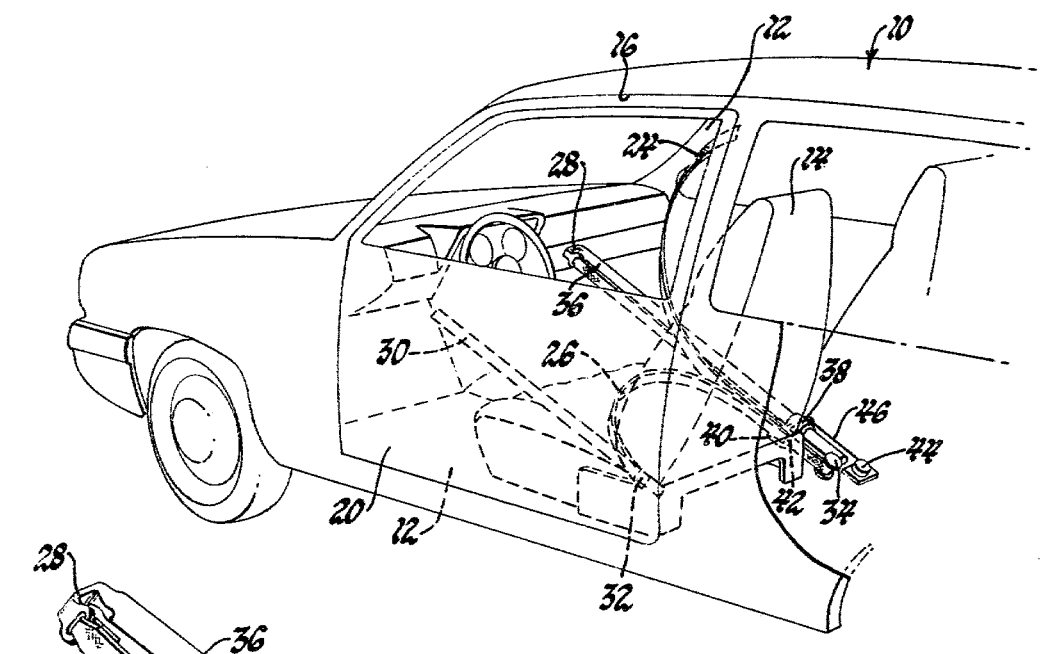
FIG. 2 is a view similar to FIG. 1 showing the lap and shoulder belts disposed in their respective occupant restraining positions with the vehicle door in the closed position.

A track 36 and a carriage 38 cooperate to move the inboard portions of the shoulder belt 24 and lap belt 26 between the forwardly stowed position of FIG. 1 and the occupant restraining position of FIG. 2. As best seen in FIG. 1, the track 36 has a forward end attached to a suitably reinforced instrument panel and a rearward end suitably attached to the vehicle floor inboard the occupant seating position. The carriage 38 is suitably mounted for sliding movement along the track 36 between a forwardmost position of FIG. 1, generally adjacent the instrument panel structure of vehicle body and a rearward position of FIG. 2, generally adjacent the hip of the seated occupant. The belt carriage 38 has a slide loop 40 which slidably receives the shoulder belt 24 and a slide loop 42 which slidably receives the lap belt 26.

Figure 3:
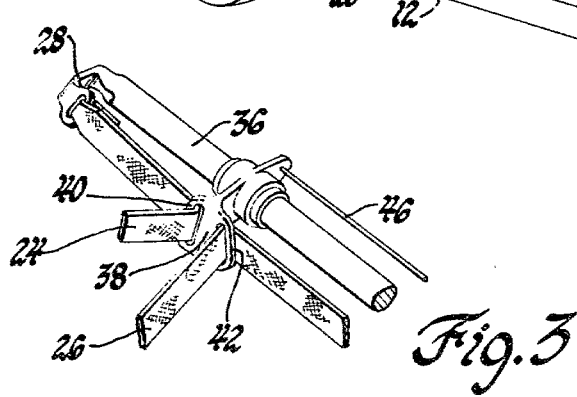
FIG. 3 is an enlarged fragmentary view of FIG. 1.

As best seen in FIG. 3, the inboard end of the shoulder belt 24 is preferably attached to the forward end of the track 36. The lap belt retractor 34 is preferably attached to the rearward end of the track 36. Accordingly, the longitudinal component of occupant restraint load imposed upon the lap and shoulder belts result in balanced axial compressive forces on the track 36. The carriage 38 is urged to its rearward position of FIG. 2 by a spring reel assembly 44 which winds a cable 46 attached to the carriage 38.

OPERATION

Referring to FIG. 2, it is seen that the occupant restraining shoulder belt 24 and lap belt 26 assume their normal occupant restraining positions when the vehicle door is closed. The outboard end of the lap belt 26 is drawn to its rearward restraining position by the linear locking retractor assembly 30. The inboard end of the lap belt 26 is retracted by the retractor 34. The carriage 38 is drawn to the rearward position of FIG. 2 by the spring reel assembly 44 winding the cable 46 connected with the carriage 38. If the vehicle encounters a rapid deceleration condition, the lap belt retractor 34 prevents unwinding of the inboard lap belt end while the linear locking retractor 30 prevents forward extension of the outboard lap belt end.

The carriage 38 is retained in its rearward position of FIG. 2 by any of several suitable locking mechanisms known in the prior art. For example, an inertia lock or the like may be associated with the spring reel assembly 44 to lock the cable 46 and thereby lock the carriage 38 against forward movement. Another suitable locking mechanism is the linear locking retractor mechanism as disclosed in the above-described patent applications by Manz et al and Irwin et al. Furthermore, the carriage 38 could be locked in the rearward position by a D-ring type male connected attached to the carriage for entry into a conventional seat belt buckle mounted on the vehicle body inboard the seat as disclosed in German Offenlegungsschrift No. 2,261,374. The seat belt buckle would be released by a solenoid or the like when the door is opened to permit forward movement of the carriage to move the belts to the stowed position of FIG. 1.

When the occupant wishes to alight from the vehicle, the door is moved to the open position of FIG. 1. The outboard end of the shoulder belt 24 is moved outwardly and, by virtue of its fixed length, moves slidably through the slide loop 40 of carriage 38 while inducing forward movement of the carriage 38. The forward movement of the carriage 38 induced by the shoulder belt 24 causes the lap belt 26 to slide through the slide loop 42 and be withdrawn from the retractor 34 and the linear locking retractor 30. Accordingly, the inboard portions of both the lap and shoulder belts are moved forwardly of the occupant seat 14 while the outboard belt ends are simultaneously moved forwardly of the occupant by the swing geometry of the door.

When the door is again closed, the inward movement of the shoulder belt 24 permits the reel assembly 44 to retract the carriage 38 in the rearward direction to restore the lap and shoulder belts to their respective occupant positions of FIG. 2.

While this invention has been disclosed primarily in terms of the specific embodiments shown in the drawings, it is not intended to be limited thereto, but rather only to the extent set forth in the appended claims. For example, the drawings show the shoulder belt as a fixed length belt having its inboard end attached to the instrument panel structure. However, it is within the scope of the invention to have the lap belt as a fixed length belt having its inboard end attached to the instrument panel structure. Accordingly, the shoulder belt would be mounted on the vehicle body floor inboard the occupant seat. Furthermore, while the drawings show the lap belt having a linear locking retractor at the outboard end and a retracting reel at the inboard end, it is within the scope of the invention to utilize a retractor of either type at only one end of the lap belt.

Thus, the invention provides a new and improved passive seat belt system wherein the inboard portions of door mounted lap and shoulder belts are automatically moved fore and aft along a track inboard the seat and without necessity of occupant actuation of a motor powered apparatus.

The embodiments of the invention in which an exclusive property or privilege is claimed are defined as follows:

1. In a motor vehicle body having a door mounted laterally adjacent an occupant seat, a passive seat belt system comprising:
   a restraint belt of fixed length having an outboard end attached to the vehicle door and an inboard end attached to the vehicle body forwardly of the seat;
   a track extending longitudinally of the vehicle body inboard the occupant seat;
   a belt carriage movable along the track and slidably receiving the belt intermediate the inboard and outboard ends, said carriage being movable along the track between a forward position stowing the belt forwardly of a seated occupant and a rearward position establishing the belt in a restraining position closely adjacent the seated occupant;
   spring means urging the carriage toward the rearward position;
   opening movement of said door causing the outboard end of the belt to be moved outwardly and forwardly whereby sliding movement of the belt through the belt carriage causes movement of the belt carriage to the forward position to stow the belt.

2. In a motor vehicle body having a door mounted laterally adjacent an occupant seat, a passive seat belt system comprising:
   a lap belt and a shoulder belt having outboard ends attached to the vehicle door for movement of the lap and shoulder belts to a forward stowed position when the door is open and to a rearward occupant restraining position when the door is closed, said lap and shoulder belts having inboard ends;
   means attaching the inboard end of the shoulder belt on the vehicle body inboard and forward the seat;
   means attaching the inboard end of the lap belt inboard the seat and generally adjacent the hip of the occupant;
   a lap belt retracting means associated with at least one end of the lap belt;
   a track extending longitudinally of the vehicle body inboard the occupant seat;

a belt carriage movable along the track and slidably receiving the shoulder belt intermediate the inboard and outboard ends so that opening movement of the door moves the outboard end of the shoulder belt outwardly and forwardly to induce sliding movement of the shoulder belt through the carriage and move the carriage forwardly so that both the inboard and outboard ends of the shoulder belt are moved to stowed positions forward of the occupant;

spring means urging the carriage toward a rearward position establishing the inboard end of the shoulder belt in a restraining position closely adjacent the hip of the occupant;

and a belt loop on the carriage slidably receiving the lap belt intermediate the inboard and outboard ends so that the lap belt is retracted to the restraining position when the carriage is in the rearward position and the lap belt is slidably withdrawn through the belt loop and from the retracting means by opening movement of the door and the forward movement of the carriage by the shoulder belt.

3. The seat belt system of claims 1 or 2 further characterized by locking means acting between the belt carriage and the track for selectively locking the belt carriage at the rearward position.

* * * * *